United States Patent [19]

Graham et al.

[11] 4,431,115

[45] Feb. 14, 1984

[54] APPARATUS AND METHOD FOR SINGULATING SEEDLINGS

[75] Inventors: Larry F. Graham; Roger P. Rohrbach, both of Raleigh, N.C.

[73] Assignee: North Carolina State University, Raleigh, N.C.

[21] Appl. No.: 326,471

[22] Filed: Dec. 2, 1981

[51] Int. Cl.³ .............................................. B65H 1/06
[52] U.S. Cl. ..................................... 221/63; 221/211
[58] Field of Search ............... 111/2, 3; 221/210, 211, 221/63, 204, 219, 238

[56] References Cited

U.S. PATENT DOCUMENTS 2,816,760 12/1957 Seragnoli ............................ 221/211
2,947,445 8/1960 Potter ................................... 221/210

FOREIGN PATENT DOCUMENTS 1245013 9/1960 France .................................... 111/3

Primary Examiner—Stanley H. Tollberg
Attorney, Agent, or Firm—Bell, Seltzer, Park & Gibson

[57] ABSTRACT

An apparatus and method for singulating seedlings in which bundled seedlings are contained within a hopper and are intermittently tumbled. Seedlings are singulated by being engaged with a vacuum nozzle, separated from a bundle of seedlings, gripped, and extracted from the hopper.

11 Claims, 9 Drawing Figures

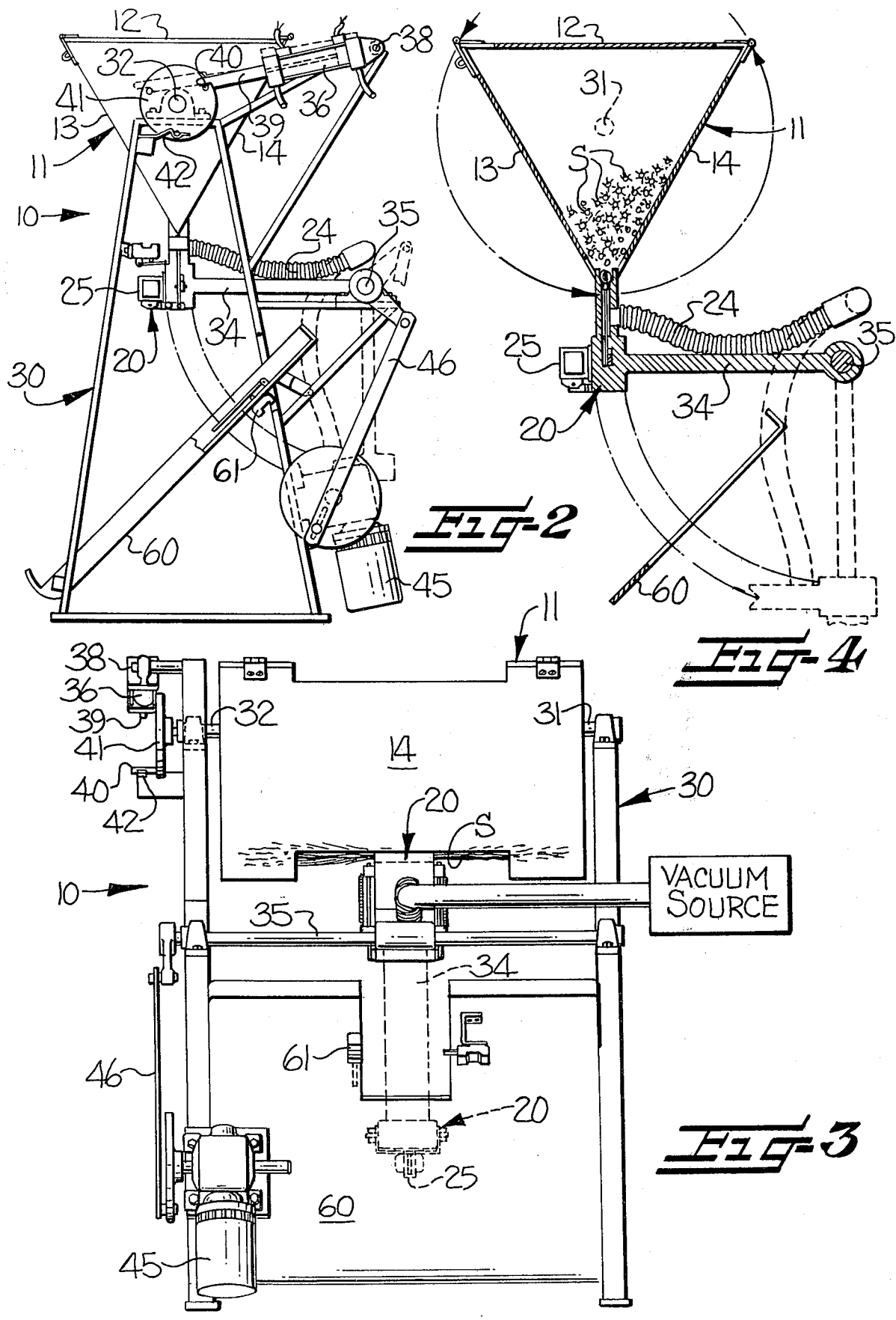

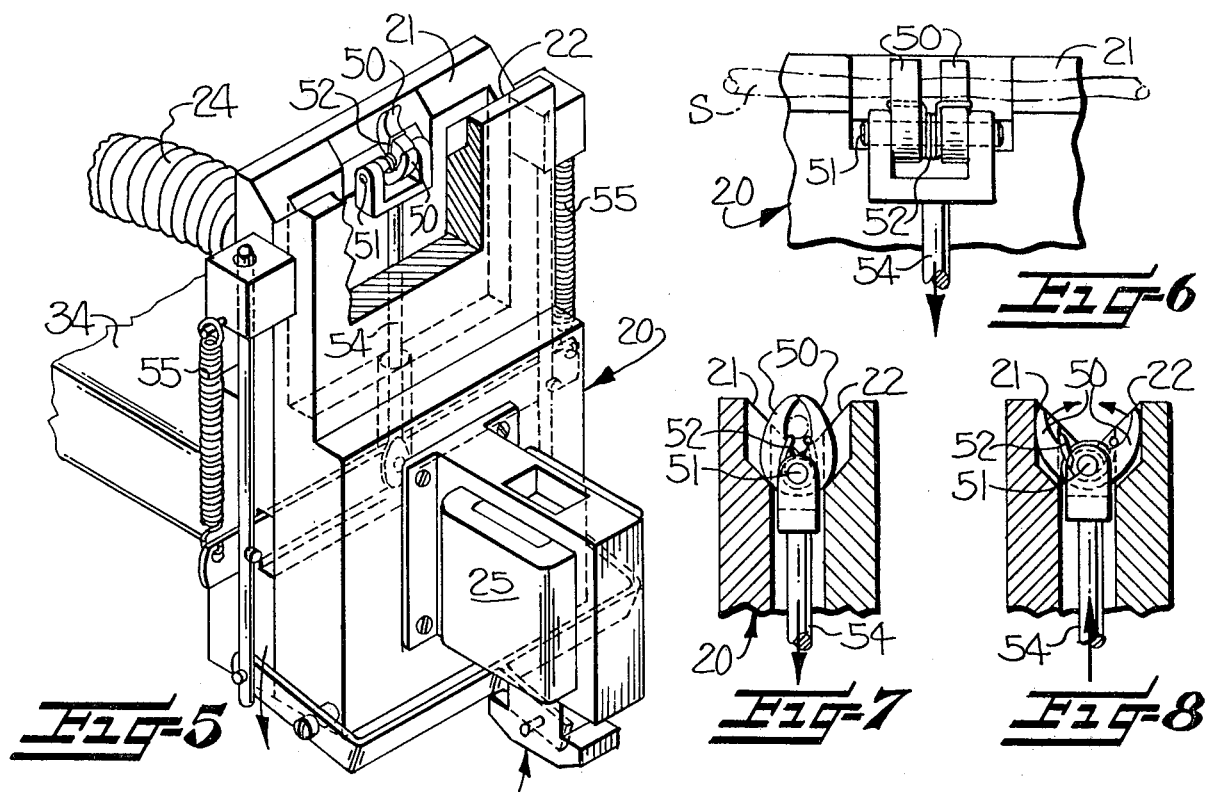
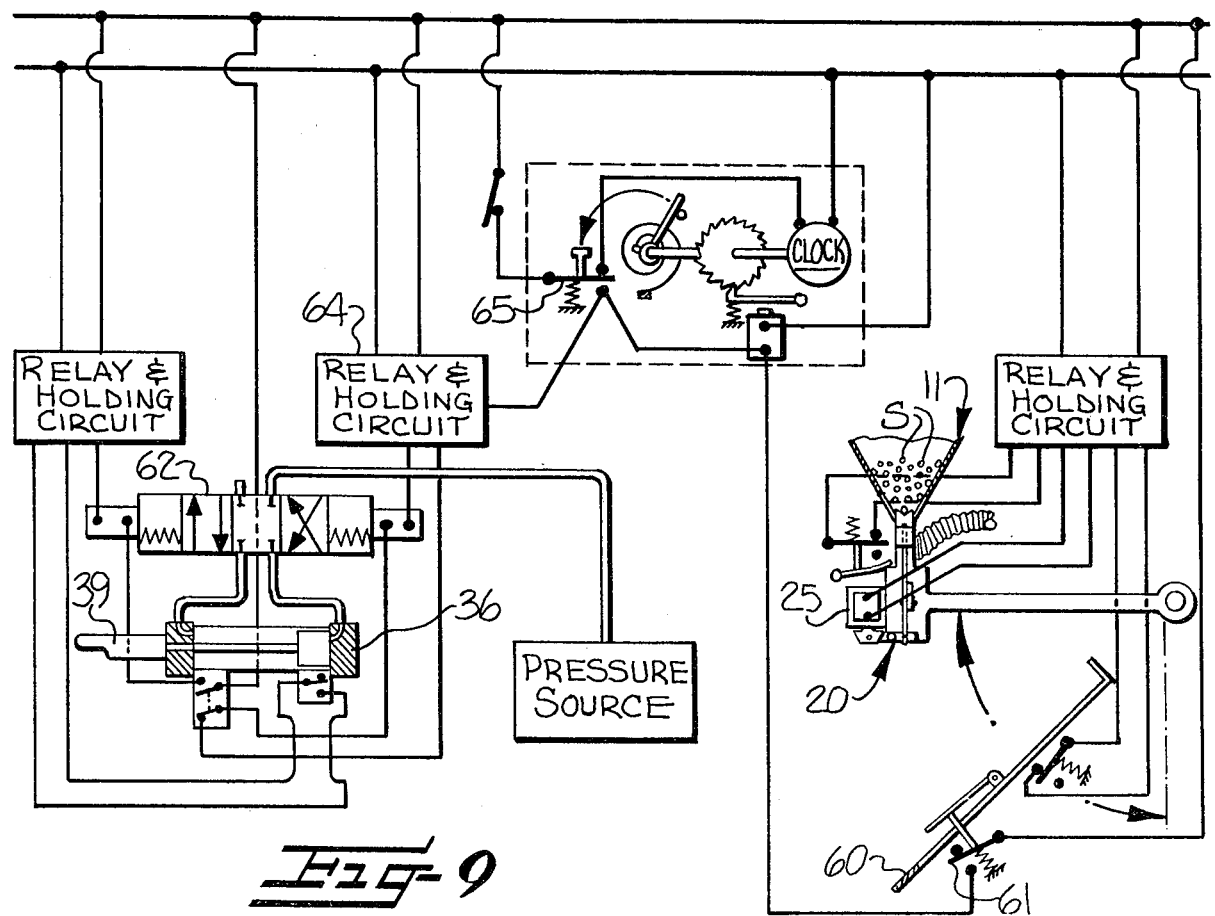

4,431,115

APPARATUS AND METHOD FOR SINGULATING SEEDLINGS

FIELD AND BACKGROUND OF INVENTION

This invention relates to singulating seedlings.

Forestry practices currently in wide use provide for establishing forest stands by planting seedlings which have been grown from seed in a nursery. Inasmuch as nursery plantings are typically done at some distance from forest sites to be established, seedlings are lifted from nursery beds, bundled for ease in handling, and transported to forest sights for planting. The process of bundling and transporting seedlings has been recognized as introducing difficulty in the subsequent handling of single seedlings which is necessary to the planting operation. The separation of individual seedlings from a bundle has come to be known as singulating.

A number of apparatus have been proposed heretofore for performing the task of singulating seedlings from a bundle of seedlings. Typically, apparatus and methods for singulating seedlings must balance the difficulties of handling seedlings in a bundle against the problems of excessive injury to seedlings by the exertion of force on the seedlings in the process of singulation. Solutions to these problems are still being sought.

BRIEF DESCRIPTION OF INVENTION

With the foregoing in mind, it is an object of the present invention to provide for singulating seedlings in accordance with a method and through the use of an apparatus which successfully extracts seedlings from a bundle while avoiding injury to the seedlings. In realizing this object of the present invention, a bundle of seedlings are contained within a hopper having particular characteristics and, from time to time, are tumbled within the hopper. Such tumbling action loosens the entanglement of the bundled seedlings and facilitates singulation in accordance with the present invention.

Yet a further object of the present invention is the minimization of injury or damage to seedlings undergoing singulation. In accordance with this aspect of the present invention, seedlings within a hopper are engaged by a vacuum seedling capture nozzle capable of exerting on one engaged seedling a vacuum force perpendicular to the longitudinal axis of the seedling and having a magnitude sufficient to separate the engaged seedling from other seedlings bundled therewith a sufficient distance to ensure efficient subsequent mechanical capture of the engaged seedling. The vacuum capture nozzle, as described more fully hereinafter, is configured and operated in such a manner as to exert force on one engaged seedling while adjacent seedlings do not have such force exerted thereon.

Yet a further object of the present invention is to provide an apparatus for singulating seedlings in which an elongate polygonal hopper is employed and in which a plurality of seedling release openings are provided. As a consequence of the provision of a plurality of seedling release openings, rotation of the hopper and tumbling of the seedling bundle therewithin presents various portions of the bundle for seedling capture and extraction.

BRIEF DESCRIPTION OF FIGURES

Some of the objects of the invention having been stated, other objects will appear as the description proceeds, when taken in connection with the accompanying drawings, in which

FIG. 2 is a reduced side elevation view of the apparatus of FIG. 1;

FIG. 3 is a rear elevation view of the apparatus of FIGS. 1 and 2;

FIG. 4 is a schematic sectional view of the apparatus of FIGS. 1 through 3;

FIG. 5 is an enlarged perspective view, partly broken away, of a vacuum seedling capture nozzle as incorporated in the apparatus of FIGS. 1 through 4;

FIG. 6 is an enlarged view of a gripper mechanism forming a portion of the nozzle of FIG. 5;

FIGS. 7 and 8 are sectional and elevation views of the mechanism of FIG. 6, showing the operation of the gripper mechanism; and FIG. 9 is a schematic representation of one control arrangement for the apparatus of FIGS. 1 through 5.

DETAILED DESCRIPTION OF INVENTION

Figure 1:
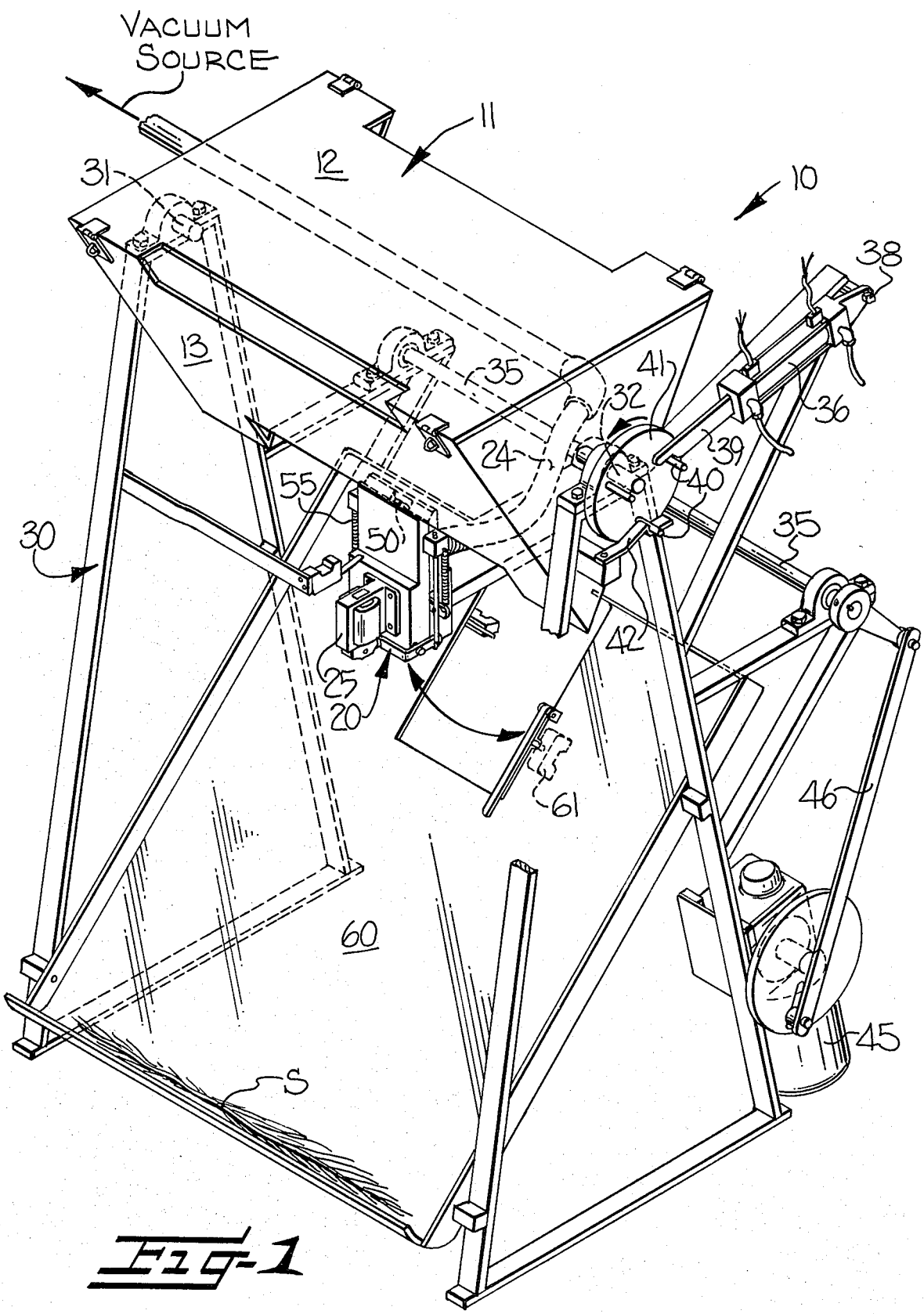
FIG. 1 is a perspective view of an apparatus embodying the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

An apparatus for singulating seedlings in accordance with the present invention is illustrated in FIG. 1 and is there generally indicated at 10. In the particular form shown, the apparatus 10 is essentially free standing, and is not associated with any specific mechanical planting apparatus or the like. However, it is contemplated that the apparatus and method of the present invention may be applicable to a wide variety of mechanical planting apparatus and methods. Accordingly, the description which follows is to be understood as merely illustrative of a particular mounting and drive arrangement. It is contemplated that persons skilled in the design, manufacture and use of planting apparatus for the forestry industry will be able to apply the novel characteristics of the present invention with a variety of other drives and the like.

The apparatus 10 includes an elongate polygonal hopper means generally indicated at 11. The hopper means 11 is for containing bundled seedlings (indicated at S in FIG. 4) and has a length greater than the length of the seedlings to be contained therewithin. Preferably, the hopper means 11 has a polygonal cross section and one preferred cross section is the triangular cross section shown in the drawing. The purpose of the polygonal cross section will become more clear from the discussion which follows. The three walls 12, 13, 14 defining the triangular cross section hopper means 11 also define a plurality of seedling release openings parallel to the longitudinal axis of the hopper means 11 and extending along portions of apex side edges thereof. Each of the seedling release openings has a length less than the length of the seedlings S to be contained within the hopper means 11.

A seedling capture means generally indicated at 20 is provided for engaging seedlings contained within the hopper means 11 and for exerting on one engaged seedling a force perpendicular to the longitudinal axis of the hopper means 11 and having a magnitude sufficient to overcome any resistance to extraction of the one engaged seedling from the hopper means and from any other seedlings bundled therewith. With the bundle of seedlings positioned within the hopper 11 lengthwise thereof, the force exerted on the seedling by the caprure means 20 will also be understood as being perpendicular to the longitudinal axis of the seedling. Preferably, and in the form indicated, the seedling capture means 20 takes the form of a vacuum nozzle and mechanical gripper (FIGS. 4 and 5). The vacuum nozzle is configured to have a notched seedling engaging surface defined by a pair of walls 21, 22. A central opening or slot between the walls 21, 22 is operatively connected, such as by a vacuum hose 24, to an appropriate vacuum source (FIG. 3). A solenoid 25 and linkage operate the gripper mechanism (FIGS. 5 through 8).

Means are provided for mounting the hopper means 11 and the seedling capture means 20 in particular relations one relative to another and for particularly defined movements. In the illustrated form of the present invention, the mounting means includes a frame generally indicated at 30 by which the hopper means 11 is mounted for rotation about its longitudinal axis. More particularly, the hopper means 11 has a pair of stub shafts 31, 32 mounted on end walls thereof and aligned with the longitudinal axis of the hopper means 11, with the shafts 31, 32 being mounted in bearings which are supported by the frame 30. The capture means 20 and hopper means 11 are mounted in the frame 30 for relative movement therebetween in a direction perpendicular to the longitudinal axis of the hopper means 11. In the illustrated form, such movement is arcuate, in that the capture means 20 is mounted at the end of a swinging arm 34 which is fixed to a rocking shaft 35. Upon rotation of the rocking shaft 35, the swing arm 34 and the seedling capture nozzle are moved between a raised, capture position (solid lines in FIG. 4) and a lowered, seedling delivered position (dashed lines in FIG. 4).

In order to accomplish certain movements important to the present invention and as described more fully hereinafter, drive means are provided for the hopper 11 and for the capture means 20. In the form illustrated, the drive means for the hopper 11 comprises an expansible chamber device in the form of an air cylinder 36. The air cylinder 36 is mounted at one end from a portion of the frame 30 for pivotal movement, such as about a mounting bolt 38. The piston movable within the cylinder device 36 is operatively connected with a pusher bar 39 which engages a series of pins 40 which extend from a drive disc 41 fixed to one stub shaft 32 for the hopper means 11. A detent spring 42 engages one of the pins 40, normally retaining the hopper means 11 in a particular rotational orientation. The rotational orientation is such that one of the seedling release openings is directed downwardly, so that a bundle of seedlings contained within the hopper means 11 will be exposed for access by the seedling capture means 20.

Periodically, as pointed out hereinafter, air pressure is delivered to the cylinder device 36, causing the pushing element 39 to be extended so as to rotate the hopper means 11. As such rotation occurs, a bundle of seedlings contained within the hopper means 11 is tumbled for loosening the seedlings contained within the bundle. The stroke of the cylinder device 36 is such that each extension of the pushing element 39 rotates the hopper means 11 through 120 degrees of rotation, tumbling the bundle of seedlings while bringing a next following seedling release opening into position for cooperation with the seedling capture means 20. Such rotation is indicated by arrows in FIG. 4.

Drive means, shown in the form of an electrical gear motor 45, are provided for moving the rock shaft 35 and the swing arm 34 on which the seedling capture means 20 is mounted. More particularly, through a crank link 46, an oscillating rotary motion is imparted to the shaft 35. With movement of the seedling capture means 20 upwardly toward the hopper, the vacuum nozzle provided between the walls 21, 22 engages seedlings within the hopper means 11. Due to the exertion of a vacuum on the vacuum nozzle formed as a portion of the seedling capture means 20, and the inclination of the walls 21, 22 with respect to one another, engaged seedlings are moved until such time as one engaged seedling lies at the apex of the angle formed by the walls 21, 22. When so positioned, the force exerted on that one, lowermost engaged seedling by the vacuum exerted on the vacuum nozzle seedling capture means 20 is such as to have a magnitude sufficient to separate the engaged seedling from other seedlings bundled therewith a sufficient distance for mechanical gripping as hereinafter described. Other engaged seedlings, not located at the apex of the angle formed by the walls 21, 22, will not have vacuum force exerted thereon which has such a high magnitude as to be sufficient to accomplish the mentioned separation. Following separation of a seedling in the manner described, the next downward movement of the swing arm 34 will cause bowing of the separated seedling downwardly relative to the hopper 11.

Mounted within the seedling capture means 20 is a gripper mechanism operated by the solenoid 25 as briefly mentioned above (FIGS. 5 through 8). The gripper mechanism includes a pair of finger members 50 mounted for pivotal movement about a gripper shaft 51 and biased toward an opened position (FIGS. 5 and 8) by a spring 52. The gripper shaft 51 is mounted within an upper yoke portion of an actuating link 54 movable vertically within the capture means 20 by an appropriate mechanism which includes spring means 55 for biasing the actuating link 54 upwardly.

After the separation and the downwardly bowed positioning of a seedling by the vacuum nozzle, the solenoid 25 is engerized to move the actuating link 54 and cam the fingers 50 one toward the other by engagement with the walls of the vacuum nozzle (FIG. 7). Thus, a seedling separated from a bundle is mechanically gripped so that continuing downward movement of the swing arm 34 will exert on the seedling a force having a magnitude sufficient to overcome any resistance to extraction of the one engaged seedling from the hopper 11.

A seedling extracted from the hopper 11 is then stripped from the seedling capture means 20 by a chute 60 mounted within the frame 30 of the apparatus 10. As the seedling is stripped, it engages a sensing switch 61, which forms a portion of a control arrangement for the apparatus of the present invention as illustrated in FIG. 9.

More particularly, control over the delivery of air to the expansible chamber device 36 is exerted by a control valve 62. The control valve 62, illustrated as being electrically operated, is controlled by sets of relays and holding circuits responsive to extension and retraction of the pushing element 39 and to a time related control arrangement capable of distinguishing singulation failure. As will be noted in FIG. 9, one relay and holding circuit 64 effective for operating the valve 62 to rotate the hopper means 11 is energized and actuated in response to a control switch 65. The control switch 65 may be operated manually (when it is desired to rotate the hopper means) or through the operation of a clock driven device which is responsive to closure of the seedling sensing switch 61. In the event that no seedling is sensed within a predetermined time interval (adjusted to meet the cycle of operation of the apparatus 10), then a clock mechanism drives an actuator to a position to close the switch 65, delivering pressure fluid to the device 36 and rotating the hopper 11. An arrangement of switches and relays is also provided for operating the solenoid 25 for the gripper mechanism as described above. While the control arrangement here illustrated and described is operative to periodically rotate the hopper and tumble the bundle of seedlings for loosening the seedlings, it will be appreciated that a variety of other control arrangements may be designed and used by persons of appropriate skill in the applicable arts, while still attaining the desired result of the present invention. Accordingly, the specific control arrangements and mounting arrangements here shown are to be understood as broad, teaching disclosures and not as limiting upon the scope of the present invention.

In the drawings and specification, there has been set forth a preferred embodiment of the invention, and although specific terms are employed, they are used in a generic and descriptive sense only and not for purposes of limitation.

That which is claimed is:

1. Apparatus for singulating seedlings comprising:
   elongate hopper means for containing bundled seedlings and having a length greater than the length of seedlings to be contained therewithin, said hopper means defining a seedling release opening parallel to the longitudinal axis of said hopper means and extending along portions of a side thereof and which has a length less than the length of seedlings to be contained within said hopper means,
   vacuum nozzle means for engaging seedlings contained within said hopper means and for exerting on one engaged seedling a vacuum force perpendicular to the longitudinal axis of said hopper means and having a magnitude sufficient to separate the one seedling from other seedlings bundled therewith, and
   means mounting said hopper means for rotation about said longitudinal axis and mounting said nozzle means and said hopper means for relative movement therebetween in a direction perpendicular to the longitudinal axis of said hopper means for intermittent tumbling of bundled seedlings within said hopper means and for singulation of successive separated ones of engaged seedlings.

2. Apparatus for singulating seedlings comprising:
   elongate hopper means for containing bundled seedlings and having a length greater than the length of seedlings to be contained therewithin, said hopper means defining a seedling release opening parallel to the longitudinal axis of said hopper means and extending along portions of a side thereof and which has a length less than the length of seedlings to be contained within said hopper means,
   seedling capture means for engaging seedlings contained within said hopper means and for exerting on one engaged seedling a force perpendicualr to the longitudinal axis of said hopper means to separate the one seedling from the other seedlings bundled therewith and thereafter gripping the one engaged seedling with a force having a magnitude sufficient to overcome any resistance to extraction of said one engaged seedling from said hopper means, and
   means mounting said hopper means for rotation about said longitudinal axis and mounting said capture means and said hopper means for relative movement therebetween in a direction perpendicular to the longitudinal axis of said hopper means for intermittent tumbling of bundled seedlings within said hopper means and for singulation of successive captured ones of engaged seedlings by extraction thereof from said hopper means.

3. Apparatus for singulating seedlings comprising:
   elongate hopper means for containing bundled seedlings and having a length greater than the length of seedlings to be contained therewithin, said hopper means defining a seedling release opening parallel to the longitudinal axis of said hopper means and extending along portions of a side thereof and which has a length less than the length of seedlings to be contained within said hopper means,
   vacuum nozzle means for engaging seedlings contained within said hopper means and for exerting on one engaged seedling a vacuum force perpendicular to the longitudinal axis of said hopper means and having a magnitude sufficient to separate the one seedling from other seedlings bundled therewith,
   gripper means mounted in operative association with said nozzle means for gripping said separated seedling with a force having a magnitude sufficient to overcome any resistance to extraction of said gripped seedling from said hopper means, and
   means mounting said hopper means for rotation about said longitudinal axis and mounting said nozzle means and said hopper means for relative movement therebetween in a direction perpendicular to the longitudinal axis of said hopper means for intermittent tumbling of bundled seedlings within said hopper means and for singulation of successive ones of the engaged seedlings by extraction thereof from said hopper means.

4. Apparatus according to one of claim 1, claim 2 or claim 3 wherein said hopper means is of triangular cross-sectional configuration and wherein said means mounting said hopper means further comprises drive means for periodically rotating the hopper and tumbling the bundle of seedlings therewithin.

5. Apparatus according to claim 4 further comprising control means operatively connected with said hopper drive means for sensing singulation of seedlings and for responding to failure of seedling singulation by initiating rotation of said hopper means.

6. Apparatus according to one of claim 1 or claim 3 wherein said nozzle means comprises first and second walls extending at a predetermined angle one relative to the other and defining at the intersection thereof a seedling retaining vacuum mouth, and further wherein said means mounting said nozzle means positions said intersection parallel to said longitudinal axis of said hopper means for reception of said one engaged seedling therealong.

7. A method of singulating seedlings comprising:
placing an elongate bundle of seedlings into a hopper which has a length greater than the length of the seedlings and a seedling release opening parallel to the longitudinal axis of the seedlings and extending along portions of a side of the hopper for a length less than the length of the seedlings,
engaging seedlings within the hopper with a vacuum seedling capture nozzle and exerting on one engaged seedling a vacuum force perpendicular to the longitudinal axis thereof and having a magnitude sufficient to separate the one seedling from any other seedlings bundled therewith,
gripping the separated seedling and then extracting the separated seedling from the hopper,
repeating the steps of engaging, gripping and extracting individual seedlings, and
periodically rotating the hopper and tumbling the bundle of seedlings for loosening the seedlings.

8. A method of singulating seedlings comprising:
placing an elongate bundle of seedlings into a rotatable, polygonal hopper which has a length greater than the length of the seedlings and a plurality of seedling release openings parallel to the longitudinal axis of the seedlings and extending along portions of apex side edges of the hopper for a length less than the length of the seedlings,
engaging the seedlings within the hopper with a vacuum seedling capture nozzle and exerting on one engaged seedling a vacuum force perpendicular to the longitudinal axis thereof and having a magnitude sufficient to separate the one seedling from any other seedlings bundled therewith,
mechanically gripping the separated seedling with a force sufficient to overcome any resistance to extraction of the gripped seedling from the hopper,
extracting the separated and gripped seedling from the hopper,
repeating the steps of engaging, gripping and extracting individual seddlings, and
periodically rotating the hopper and tumbling the bundle of seedlings to an adjacent seedling release opening for loosening the seedlings.

9. Apparatus according to one of claim 1, claim 2 or claim 3 wherein said elongate hopper means has a polygonal cross-section defining a seedling release opening along portions of an apex side edge thereof.

10. Apparatus according to one of claim 1, claim 2 or claim 3 wherein said elongate hopper means has a polygonal cross-section and defines a plurality of seedling release openings along portions of apex side edges thereof, each said opening having a length less than the length of seedlings to be contained within the hopper means.

11. A method of singulating seedlings comprising:
placing an elongate bundle of seedlings into a hopper which has a length greater than the length of the seedlings and a seedling release opening parallel to the longitudinal axis of the seedlings and extending along portions of a side of the hopper for a length less than the length of the seedlings,
engaging the seedlings within the hopper with a vacuum seedling capture nozzle and exerting on one engaged seedling a vacuum force perpendicular to the longitudinal axis thereof and having a magnitude sufficient to separate the one seedling from any other seedlings bundled therewith,
mechanically gripping the separated seedling with a force sufficient to overcome any resistance to extraction of the gripped seedling from the hopper,
extracting the separated and gripped seedling from the hopper,
repeating the steps of engaging, gripping and extracting individual seedlings, and
periodically rotating the hopper and tumbling the bundle of seedlings for loosening the seedlings.

* * * * *